United States Patent
Bremner

(10) Patent No.: US 7,797,815 B2
(45) Date of Patent: Sep. 21, 2010

(54) CONTROL OF A DUAL ROTOR ELECTROMAGNETIC MACHINE

(75) Inventor: Ronald Dean Bremner, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 506 days.

(21) Appl. No.: 11/875,060

(22) Filed: Oct. 19, 2007

(65) Prior Publication Data
US 2008/0098588 A1 May 1, 2008

Related U.S. Application Data

(63) Continuation-in-part of application No. 11/588,546, filed on Oct. 26, 2006, now Pat. No. 7,576,465.

(51) Int. Cl.
*H02K 15/02* (2006.01)
*H02K 15/10* (2006.01)

(52) U.S. Cl. .................. 29/598; 29/596; 29/606; 310/162; 310/114; 310/254

(58) Field of Classification Search ............... 29/598, 29/596, 606; 310/162, 114, 254
See application file for complete search history.

(56) References Cited

U.S. PATENT DOCUMENTS

| 4,654,577 | A | * | 3/1987 | Howard ..................... 322/28 |
| 4,739,201 | A | | 4/1988 | Brigham et al. |
| 4,817,461 | A | | 4/1989 | Iseman |
| 5,033,265 | A | | 7/1991 | Sugden |
| 5,088,887 | A | * | 2/1992 | Bosen et al. ............ 415/124.1 |
| 5,281,879 | A | * | 1/1994 | Satake et al. ............. 310/114 |
| 5,677,605 | A | | 10/1997 | Cambier et al. |
| 5,921,731 | A | * | 7/1999 | Chandrasekar ........... 409/231 |
| 6,975,055 | B2 | | 12/2005 | Joong et al. |
| 6,998,757 | B2 | | 2/2006 | Seguchi et al. |
| 7,006,320 | B1 | * | 2/2006 | Bennett et al. .......... 360/73.03 |
| 2005/0268464 | A1 | | 12/2005 | Burjes et al. |
| 2006/0290220 | A1 | * | 12/2006 | Ionel et al. ............. 310/156.47 |

FOREIGN PATENT DOCUMENTS

| DE | 380190 C | 9/1923 |
| EP | 0186954 A1 | 7/1986 |
| GB | 2317997 A | 4/1998 |
| WO | 2004107539 A1 | 12/2004 |

* cited by examiner

*Primary Examiner*—Derris H Banks
*Assistant Examiner*—Jeffrey Carley
(74) *Attorney, Agent, or Firm*—Yee & Associates, P.C.; Marilyn Smith Dawkins

(57) ABSTRACT

The invention relates to an electric synchronous machine. There is a need for a dual rotor electric synchronous machine which has a mechanism for adjusting the rotor relative angular displacement while the machine is running in order to reduce back EMF. There is a need for such an adjusting mechanism which can carry high torque loads. An electric synchronous machine is provided with a housing, first and second shafts rotatably supported in the housing, each with a corresponding rotor fixed thereon, both having permanent magnet field poles. Each rotor is surrounded by a corresponding annular stator, and stator coils are wound through both stators. A planetary transmission is coupled between the first and second shafts and operable during rotation of the first and second shafts to adjust an angular orientation of the second shaft with respect to the first shaft.

5 Claims, 13 Drawing Sheets

CONTROL OF A DUAL ROTOR ELECTROMAGNETIC MACHINE

CROSS-REFERENCE TO RELATED APPLICATION

This is a Continuation-in-Part application of application Ser. No. 11/588,546 titled "Dual Rotor Electromagnetic Machine" by Ronald D Bremner, filed on Oct. 26, 2006 now U.S. Pat. No. 7,576,465 and having a common inventor and commonly owned at the time of the invention.

FIELD OF THE INVENTION

The present invention relates to brushless permanent magnet motors and generators, especially those which must operate over a wide speed range, such as those used in hybrid vehicles or machine tools. More specifically, the present invention relates to the control of such motor during operation of the motor.

BACKGROUND OF THE INVENTION

Brushless permanent magnet motors have a back-EMF that is proportional to their speed. At high speeds, the back-EMF of the motor can be much higher than the power supply can deliver. Above this speed, additional current out of phase with the back-EMF must be added in order to weaken the magnetic field of the motor. This is known as "field weakening", and is described in U.S. Pat. No. 5,677,605 assigned to Unique Mobility, Inc. This current creates electrical power losses and heat, and requires the electronics to have an increased current capacity.

One attempt to solve this problem is described in U.S. Pat. No. 6,998,757 wherein a multi-rotor synchronous machine includes first and second rotors disposed on the outer and inner periphery of a stator core. A mechanism installed inside the second rotor controls relative rotation of the first and second rotors. An electromagnetic machine with two rotors is described in U.S. Pat. No. 4,739,201. The rotors are angularly displaced relative to each other in order to reduce torque ripple, but no mechanism is described for controlling or varying the relative angular displacement between the rotors. Another electromagnetic machine with two rotors is described in U.S. Pat. No. 6,975,055, where the two rotors with field magnets are screwed onto a threaded rod.

However, none of these machines appears to have a mechanism for adjusting the rotor relative angular displacement which is simple, inexpensive, capable of operating while the machine is running and which can carry high torque loads. Furthermore, none of these machines use rotors which provide a back EMF with the rotors aligned at 180 degrees to each other.

SUMMARY OF THE INVENTION

Accordingly, an object of this invention is to provide a dual rotor electromagnetic machine with a mechanism for adjusting the rotor relative angular displacement which is simple and inexpensive.

Another object of this invention is to provide a dual rotor electromagnetic machine with such a mechanism which is capable of operating while the machine is running.

Another object of this invention is to provide a dual rotor electromagnetic machine with such a mechanism which can carry high torque loads.

These and other objects are achieved by the present invention, wherein an electric synchronous machine includes a housing and a pair of shafts rotatably supported in the housing. A first rotor is fixed for rotation with the first shaft and a second rotor is fixed for rotation with the second shaft. Both rotors carry permanent magnet field poles. A first annular stator is mounted in the housing and surrounds the first rotor. A second annular stator is mounted in the housing and surrounds the second rotor. Both stators have stator coils wound thereon. A gap separates the first and second stators. A coupling mechanism is coupled to the first and second shafts and is operable during rotation of the first and second shafts to adjust an angular orientation of the second shaft with respect to the first shaft.

The coupling mechanism is a planetary transmission with a first sun gear coupled to the first shaft, a second sun gear coupled to the second shaft, a first planet gear set coupled to the first sun gear, a second planet gear set coupled to the second sun gear, a planet carrier rotatably supporting the first and second planet gear sets, a fixed ring gear fixed to the housing and meshingly engaging the first planetary gear set, and a movable ring gear rotatably supported by the housing and meshingly engaging the second planetary gear set.

A method for controlling an electric synchronous machine comprises determining a desired alignment angle between two rotors each having a different length and each having at least one pair of magnets mounted on a periphery thereof. An angular alignment between the two rotors in the machine is automatically changed, using a planetary mechanism, during operation of the machine, to the desired alignment angle. The angular alignment at 0 degrees, i.e., when the two rotors are aligned with each other, enables a back EMF at a base speed to be equal to a back EMF at a maximum speed with the angular alignment at 180 degrees, i.e., when the rotors are fully misaligned with each other.

A method for manufacturing an electric synchronous machine comprises predetermining a total rotor length for a given specified machine as if the given specified machine were to have just one rotor. Different separate rotor lengths for each of the two rotors are determined based upon the given specified desired base speed and maximum speed. The electric synchronous machine is manufactured with the determined different separate rotor lengths. The different separate rotor lengths are determined based upon the following:

$\Delta$=base speed/maximum speed, and

Length of first rotor=$(0.5+\Delta/2)$*total rotor length

Length of second rotor=$(0.5-\Delta/2)$*total rotor length

For a specified voltage rating of at least one electronic motor device to drive the machine, a first number of coils based on a back emf at the base speed is determined and the electric synchronous machine is manufactured with the determined first number of coils. As such, the first number of coils is increased from a second number of coils that would be required if the second number of coils is based on the back EMF at the maximum speed for an electric synchronous machine having one rotor, or two rotors of equal lengths with rotors aligned at 0 degrees; whereby the increased number of coils decreases the current requirement of the machine.

DESCRIPTION OF THE PREFERRED EMBODIMENT

Figure 1:
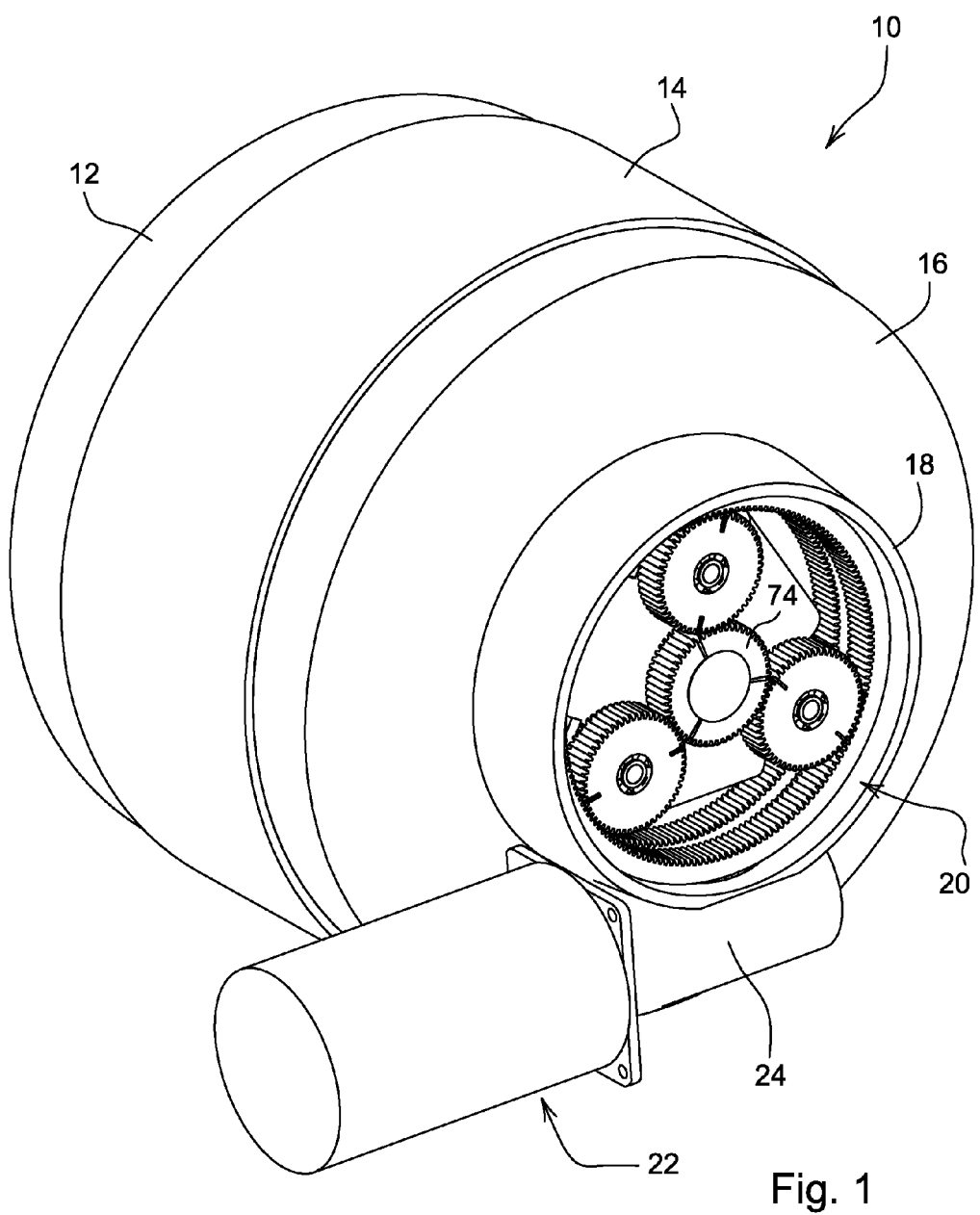
FIG. 1 is a perspective view of a electromagnetic machine embodying the present invention with an end plate removed.

Referring to FIG. 1, a multi-rotor synchronous electromagnetic machine 10 has a housing 11 which includes a first end housing 12, a center housing 14 and a second end housing 16. A cylindrical housing ring 18 projects from an end of the housing 16 and surrounds a planetary gear mechanism 20. An actuator 22 with a worm gear 24 is attached to the housing ring 18.

Figure 2:
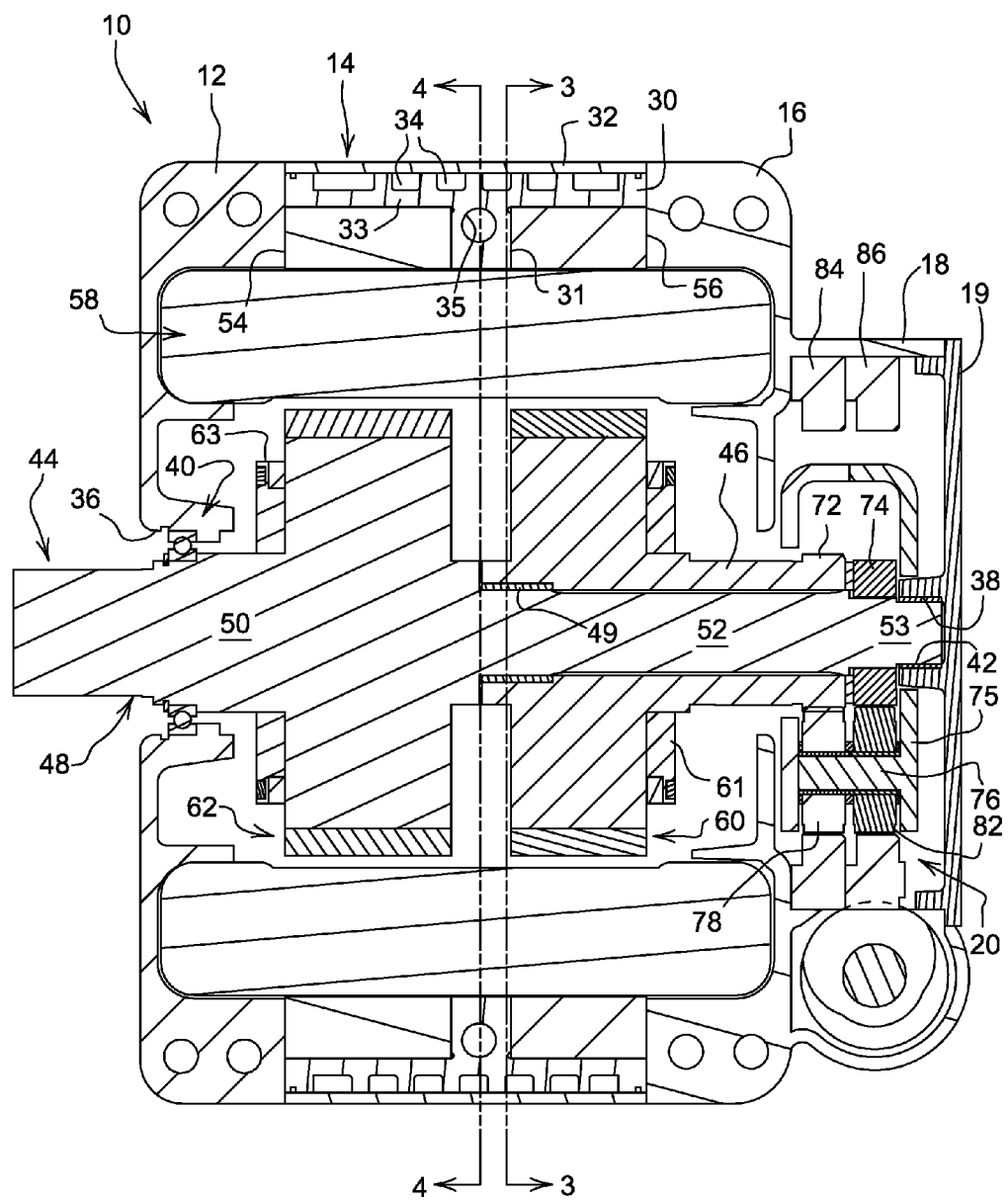
FIG. 2 is a sectional view of the electromagnetic machine of FIG. 1.

Referring now to FIG. 2, the center housing 14 has an inner sleeve 30 and an outer sleeve 32. An end plate 19 covers the housing ring 18. A plurality of water cooling channels 34 are formed in the outer peripheral surface of inner sleeve 30, and these channels 34 are covered and sealed by the outer sleeve 32. Sleeve 30 preferably has a T-shaped cross sectional shape and is formed of a heat conducting material, such as aluminum. Sleeve 30 has an annular central leg 31 which projects radially inwardly from an inner surface of cylindrical rim 33. End housing 12 has a central opening 36. End plate 19 forms a central blind bore 38. Bearing 40 is mounted in the opening 36 and a bearing 42 is mounted in the bore 38 and thereby rotatably support a two-part shaft assembly 44.

Shaft assembly 44 includes a first hollow outer shaft 46 and a second solid inner shaft 48. Second shaft 48 includes a larger diameter portion 50 and a smaller diameter portion 52 which rotatably receives first shaft 46. The larger diameter portion 50 of shaft 48 is rotatably supported by bearing 40, and an end 53 of portion 52 is rotatably supported by bearing 42. Larger diameter portion 50 extends through first shaft 46 to end 53 which projects outwardly of an axial end of first shaft 46. A bearing sleeve 49 rotatably supports an inner end of hollow shaft 46 adjacent to a shoulder which joins the larger and smaller diameter portions of shaft 48.

Hollow annular stators 54 and 56 are non-rotatably mounted inside the housing 11 concentric with the shaft assembly 44 and are preferably made of electrical steel. A conventional hollow annular coil assembly 58 is non-rotatably mounted inside the stators 54 and 56, and is also concentric with the shaft assembly 44.

A first rotor 60 is integral to or mounted on and fixed for rotation with the first shaft 46. A second rotor 62 is integral with or mounted on and fixed for rotation with the larger diameter portion 50 of second shaft 48, and is spaced axially apart from first rotor 60. An air gap separates stator assemblies 54 and 56 from the rotors 60 and 62.

An annular magnetic sensing ring 61 is mounted on shaft 46 next to an outer end surface of rotor 60. An annular magnetic sensing ring 63 is mounted on shaft 50 next to an outer end surface of rotor 62. The magnetic sensing rings 61 and 63 are conventional sensing rings and may be used to provide signals indicating the position of the shafts they are mounted on. The motor preferably has 3-phase windings. A controller (not shown) delivers current to the windings based upon the sensed position of the shafts.

Figure 5:
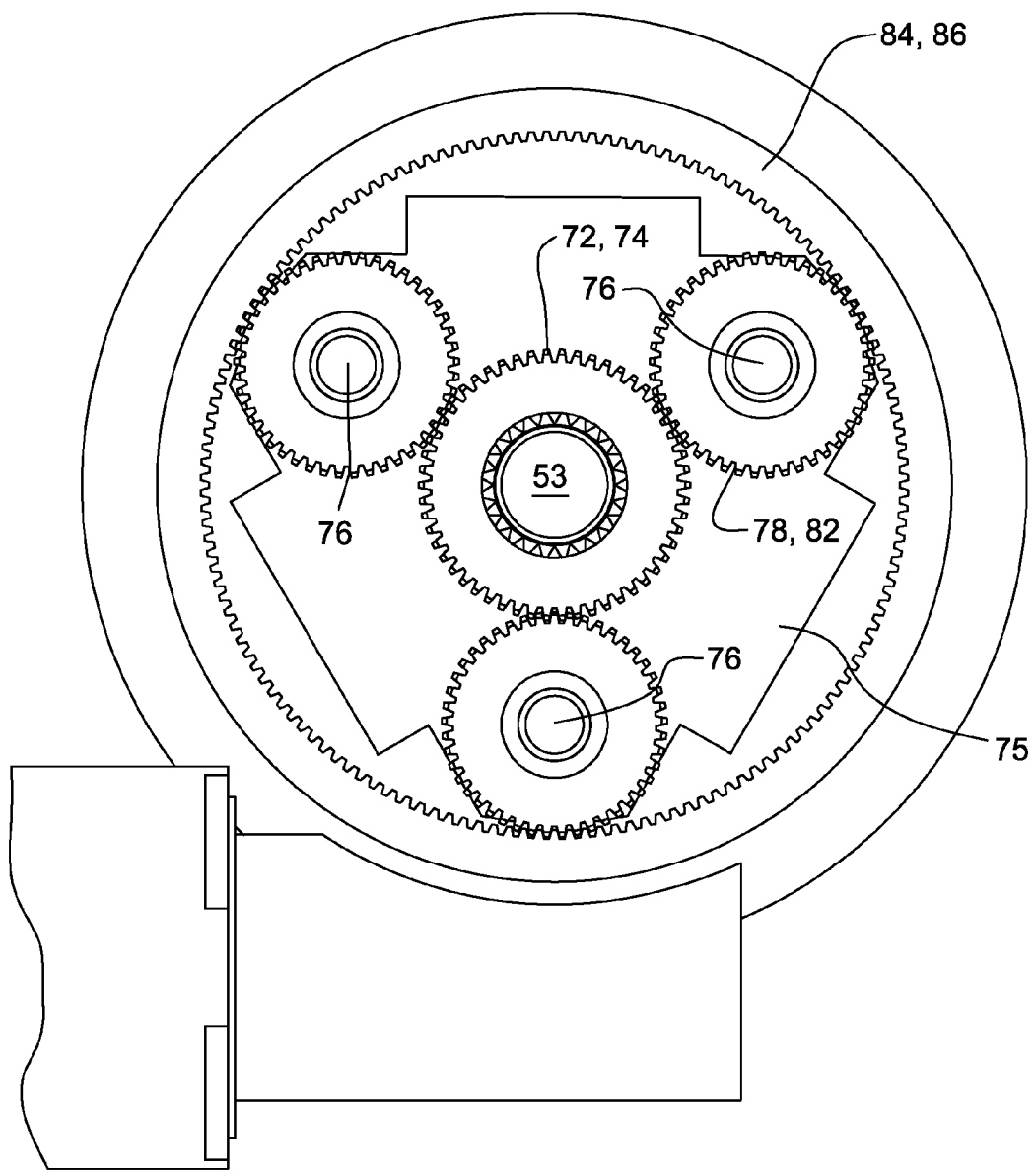
FIG. 5 is an end view of the electromagnetic machine of FIG. 1.

Referring now to FIGS. 2 and 5, a planetary transmission 20 is surrounded by housing ring 18. The planetary transmission 20 includes a first sun gear 72 formed on the outer end of first shaft 46, and a second sun gear 74 mounted on and fixed for rotation by splines (not shown) with the end 53 of the inner shaft 48. Sun gears 72 and 74 preferably have the same outer diameter. A rotatable planet carrier 75 includes a plurality of planet carrier posts 76. A first set of planet gears 78 are rotatably mounted on the posts 76 for meshing engagement with the teeth of first sun gear 72. A second set of planet gears 82 are rotatably mounted adjacent to planet gears 78 on the posts 76 for meshing engagement with sun gear 74. A fixed ring gear 84 is fixed to an inner surface of ring housing 18 and meshingly engages the first planetary gears 78. A movable ring gear 86 is rotatably mounted in the ring housing 18 adjacent to fixed ring gear 84. Ring gear 86 meshingly engages the second planetary gears 82. The worm gear 24 of actuator 22 meshingly engages teeth formed on the outer surface of ring gear 86.

Figure 3:
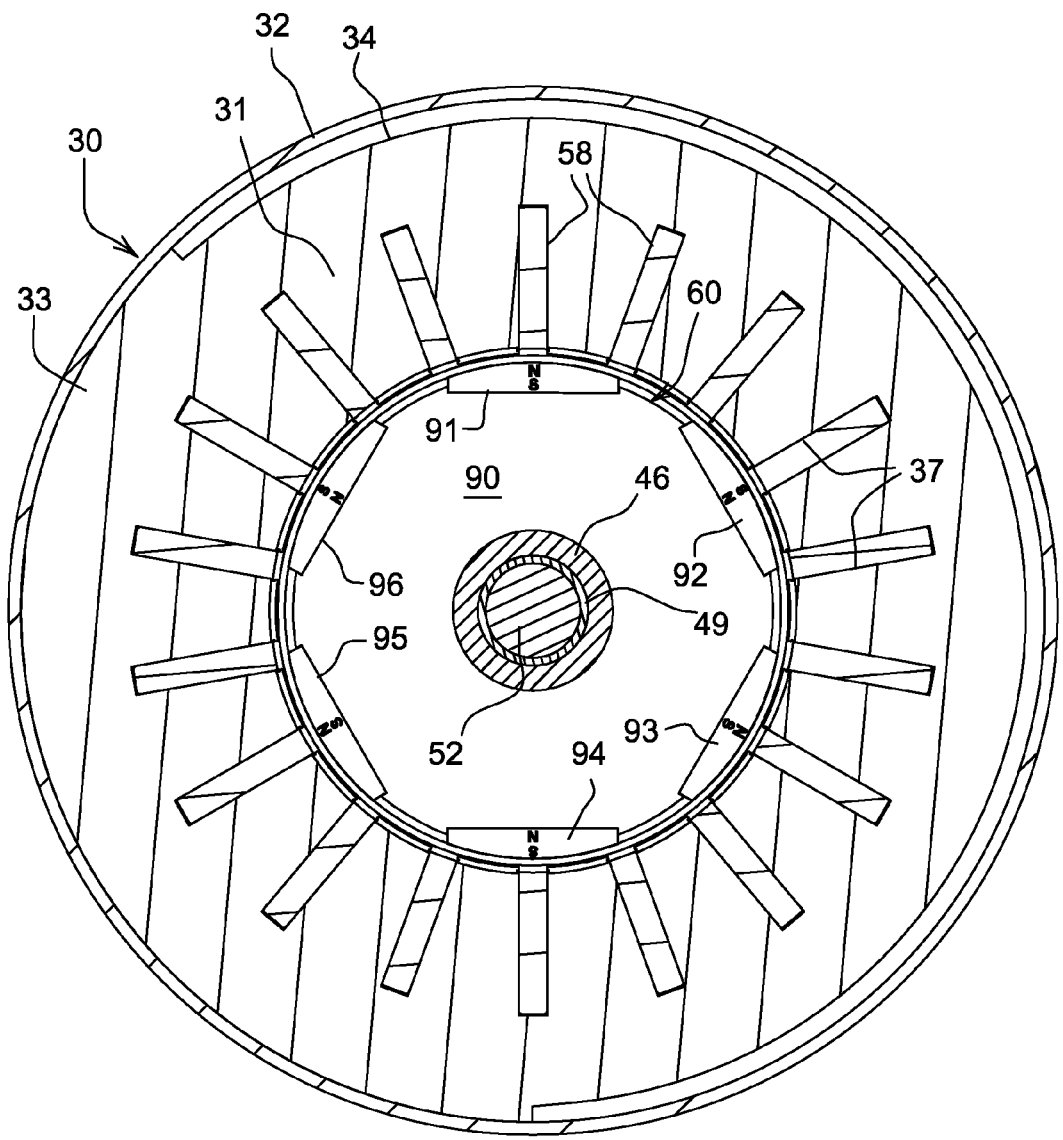
FIG. 3 is a view taken along lines 3-3 of FIG. 2.

As best seen in FIG. 3, the first rotor 60 includes an annular rotor member 90 and a plurality of permanent magnets 91-96 mounted on the periphery thereof. Magnets 91, 93 and 95 have their north magnetic poles oriented radially outwardly. Magnets 92, 94 and 96 are positioned between respective pairs of the magnets 91, 93 and 95, and have their south magnetic poles oriented radially outwardly. As a result, as one progresses around the periphery of rotor 60, each magnet has a magnetic pole orientation which is opposite to or shifted 180 degrees with respect to that of the adjacent magnet. Each rotor has at least one pair of magnets where a first one of the pair has its north magnetic pole oriented radially outward and a second one of the pair has its south magnetic pole oriented radially outward. The first one and the second one of the pair are mounted 180 degrees apart. More than one pair of magnets would be similarly positioned with respect to itself, and would be equally spaced from any other pairs of magnets such that the pole that radiated outward would alternate between north and south between the pairs of magnets equally spaced around the periphery of the rotor.

Figure 4:
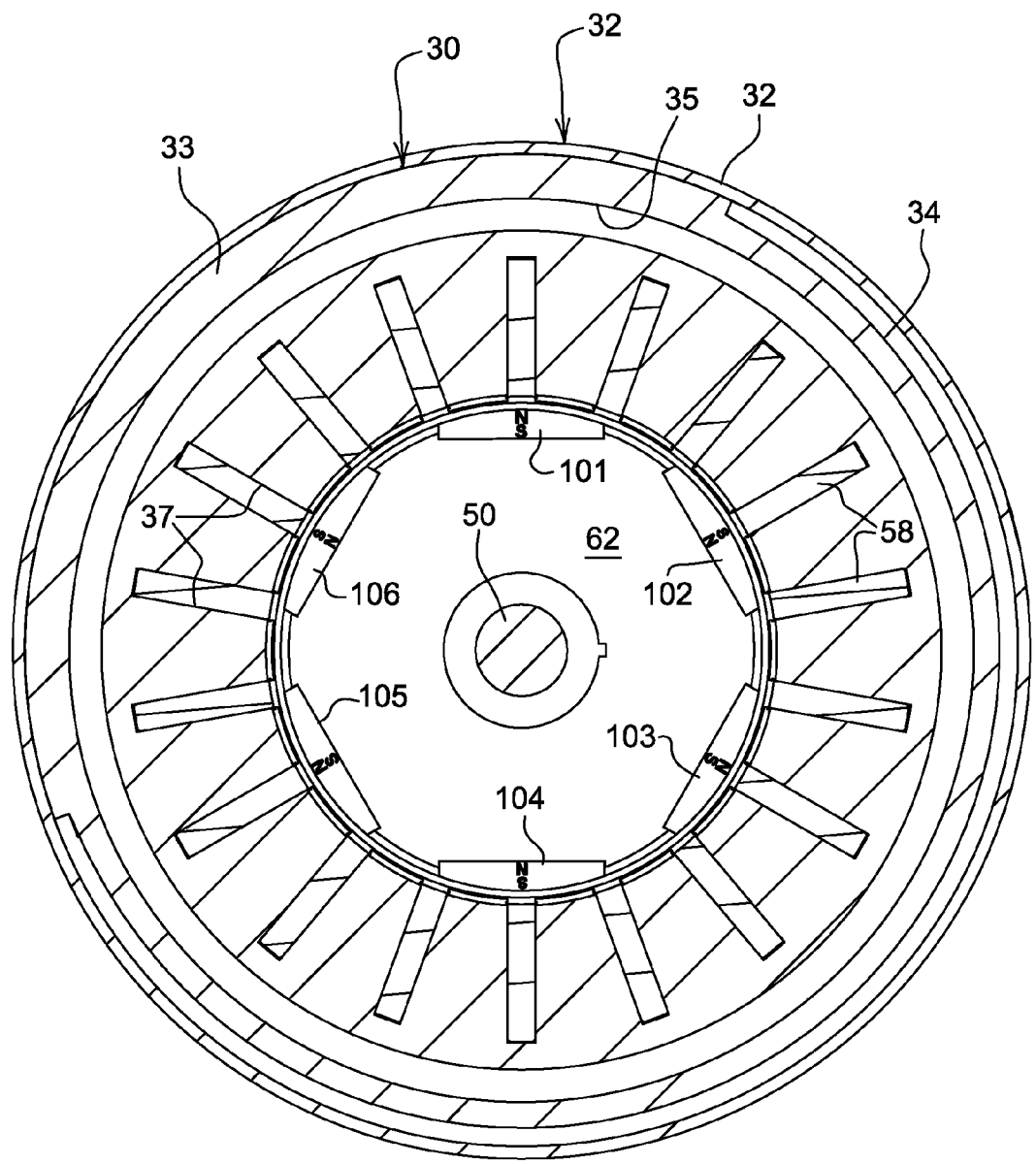
FIG. 4 is a view taken along lines 4-4 of FIG. 2.

As best seen in FIG. 4, the second rotor 62 includes an annular rotor member 100 and a plurality of permanent magnets 101-106 mounted on the periphery thereof. Magnets 101, 103 and 105 have their north magnetic poles oriented radially outwardly. Magnets 102, 104 and 106 are positioned between respective pairs of the magnets 101, 103 and 105, and have their south magnetic poles oriented radially outwardly. As a result, as one progresses around the periphery of second rotor 62, each magnet has a magnetic pole orientation which is opposite to or shifted 180 degrees with respect to that of the adjacent magnet. The magnets 91-96 and 101-106 preferably have the same angular width. They may also have the same axial length.

As best seen in FIG. 2, stators 54 and 56 are axially spaced apart, and the gap or space between them is filled by leg 31 of sleeve 30, and a coolant channel 35 is formed in leg 31 to conduct heat away therefrom. As best seen in FIGS. 3 and 4, the leg 31 of the sleeve 30 extends radially inwardly and includes a plurality of slots 37, each of which receives a corresponding one of the coils 58. As a result, the leg 31 surrounds all but the inner end of each coil 58, so as to effectively conduct heat away from the coils 58.

Figure 6:
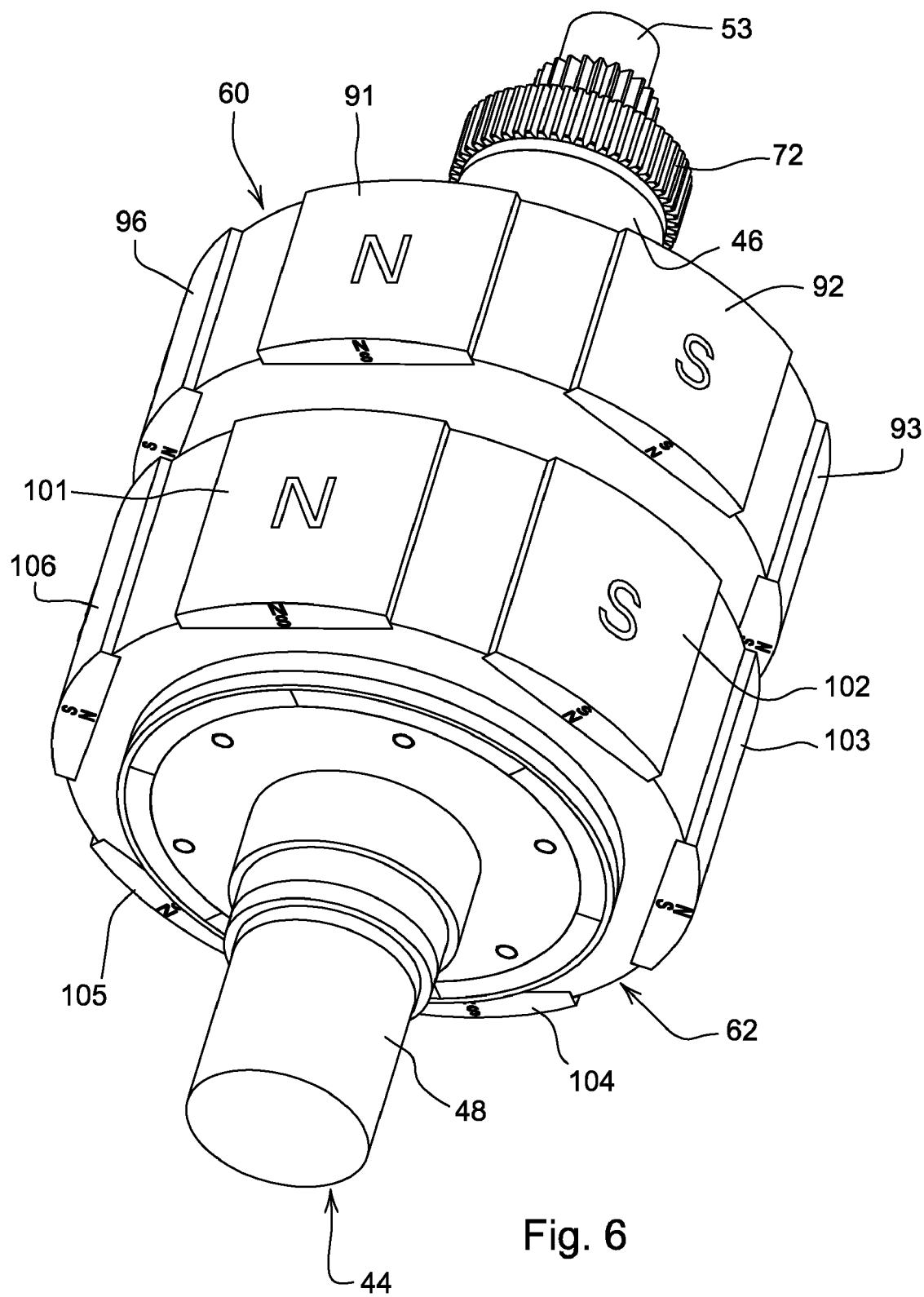
FIG. 6 is a perspective view of the rotor assembly of FIG. 1.

The rotors 60 and 62 rotate at the motor speed. As shown in FIG. 6, below a base speed, rotors 60 and 62 are oriented with respect to each other so that the north and south poles of their respective magnets 91-96 and 101-106 have the same alignment in the radial direction. This causes the voltages in each coil section 58 to create maximum back-EMF. Above a base motor speed, the rotors 60 and 62 are intentionally misaligned with respect to each other, by rotating ring gear 86. For example, rotating ring gear 86 counter-clockwise viewing FIG. 1 will rotate sun gear 74, shaft 48 and second rotor 62 clockwise with respect to first rotor 60. With the planetary transmission 20 the alignment of the rotors 60 and 62 can be varied and controlled while the motor 10 is operating, and the planetary transmission 20 will withstand operation at high power and torque levels.

Preferably, one of the rotors 60 and 62, and the magnets mounted thereon will be longer in the axial direction than the other rotor and its magnets. For example, in FIG. 2 rotor 62 is axially longer than rotor 60 in a ratio of 55% to 45%. As a result, at a base speed with the rotors 60 and 62 aligned as shown in FIG. 6, the combined EMF will be a maximum (100%). The misalignment of rotors 60 and 62 reduces the sum of the back-EMFs. Thus, at this same speed, if the rotors are fully misaligned, the combined back-EMF will be 10% of the maximum (55%-45%). At ten times the base speed, if the rotors are fully misaligned, the combined back-EMF will be 100% of the maximum at the base speed (10×(55-45)).

Alternatively, if the magnets on each rotor have the same length, size and shape, and have the same magnetic properties, the rotors can be fully misaligned (by 60 degrees for rotors carrying 6 magnets), or so that a north pole on rotor 60 is aligned with a south pole on rotor 62, and no back-EMF will be generated. Thus, the motor 10 can be configured to produce no back EMF voltage during overspeed operation, and thereby protect against voltage overloads and shorting of the coils 58.

An embodiment of the present invention controls the indexing of the rotors during operation of the motor, below and above a base speed, to achieve a desired level of back-EMF (electromotive force) voltage, if any. Controlling the indexing of the rotors includes controlling the alignment of the rotors relative to each other. The base speed may be any selected speed that produces a maximum acceptable back-EMF when the rotors are aligned.

Below the base speed, the rotors will be aligned with each other, so that the north poles on the first rotor are aligned with the north poles on the second rotor. If the rotors are aligned above the base speed, the motor will generate more back-EMF than is desired. Therefore, above the base speed, the rotors will be indexed so that the back-EMF remains approximately constant. Commercially available motor controllers do not require a constant back-EMF. However, in an embodiment of the invention, having a fairly constant back-EMF allows the controller to operate with lower current.

If the rotors are of equal length, the back EMF will become 0 when the rotors are aligned at 180 degrees. However, if the rotors are not of equal length, the back EMF at 180 degrees is determined by the following formulae:

$$\Delta = \frac{|a-b|}{a+b}$$

$$V_{180} = V_0 \Delta$$

where
$\Delta$ is the back EMF ratio, determined by the rotor lengths
a is the length of the first rotor
b is the length of the second rotor
$V_0$ is the back EMF at 0 degrees alignment
$V_{180}$ is the back EMF at 180 degrees alignment From the above, the preferred lengths of the rotors can be determined by the base speed and the maximum speed. The speed ratio can be defined as:

$$R_{speed} = \left(\frac{\text{base speed}}{\text{maximum speed}}\right)$$

Where $R_{speed}$ is the speed ratio. If $R_{speed}$ is set equal to $\Delta$, and the alignment angle is set equal to 180, the back EMF at the maximum speed will be the same as the back EMF of the aligned rotors at base speed.

From the above, the lengths of a and b can be determined by the formulae:

Length of first rotor=(0.5+$\Delta$/2)*total rotor length

Length of second rotor=(0.5-$\Delta$/2)*total rotor length

An electric synchronous machine can be configured, designed, and manufactured by predetermining a total rotor length as would be needed for a given specified electric synchronous machine having just one rotor. The different separate rotor lengths can then be determined for each rotor dependent upon a given desired base speed and maximum speed. The sum of the first rotor length plus the second rotor length equals the predetermined total rotor length.

There is a mathematical identity:

$$a\sin x + b\sin(x+\alpha) = c\sin(x+\beta)$$

where $$c = \sqrt{a^2 + b^2 + 2ab\cos\alpha}$$

and $$\beta = \arctan\left(\frac{b\sin\alpha}{a+b\cos\alpha}\right)$$

Where:
a is the magnitude of the first sine wave
b is the magnitude of the second sine wave
c is the magnitude of the resulting sine wave
$\alpha$ is the phase angle between the first and second sine wave
The $\beta$ relationship is not used by the system of the preferred embodiment.

In an embodiment, the length of the rotors are proportional to the magnitude of the sine waves. Therefore, "a" is the length of the first rotor divided by the total length of both rotors. In other words, if the first rotor is 50 mm and the second rotor is 50 mm, then a is 50/100=0.50. If the first rotor is 30 mm and the second rotor is 70 mm then a is 30/100 or 0.30. The value "b" is the length of the second rotor divided by the total length of both rotors. In a preferred embodiment, "a" and "b" are defined such that "a" plus "b" will always equal 1.

For the case where both rotors are the same length, a=b=0.50:

α is the angle one rotor is indexed compared to the second rotor. It does not matter which rotor is indexed ahead of the other.

c will determine how much back EMF the motor generates, compared to how much back EMF it would generate if the rotors were aligned. From the identity above, the maximum of c is 1, and occurs when cos α=1, which is when α=0°.

If the motor is running slower than the base speed, c will be set equal to 1, and the rotors will be aligned, having an index angle of 0°. If the motor is running faster than the base speed, the back EMF will be reduced.

For standard permanent magnet machines, the back EMF is based on the following equation:

$$E = k_E \omega_m$$

where E is the back EMF,
$k_E$ is the voltage constant, and
$\omega_m$ is the motor speed.

When the speed of the machine is higher than the base speed, for the machine described in this embodiment, the above equation can be modified to:

$$E = c(\omega) k_E \omega_m$$

where E is maintained as a constant back EMF, and $c(\omega)$ is a variable, calculated as:

$$c(\omega) = \frac{\omega_b}{\omega_m}$$

where $\omega_b$ is the base speed of the machine.

The identity above can be manipulated as follows:

$$c^2 = a^2 + b^2 + 2ab\cos\alpha$$

$$2ab\cos\alpha = c^2 - (a^2 + b^2)$$

$$\cos\alpha = \frac{c^2 - (a^2 + b^2)}{2ab}$$

$$\therefore$$

$$\alpha = \arccos\left(\frac{c^2 - (a^2 + b^2)}{2ab}\right)$$

As the motor speed varies above the base speed, c will be decreased by the equation above. The arccos of the value in parenthesis will give the angle at which the rotors need to be aligned.

In one embodiment, the calculation for arccos is performed by a processor while the machine is running. In other embodiments, a lookup table is used that was previously created by performing the calculations based on the speed of the machine. The look up table has desired angles for increments of motor speed at which the rotors need to aligned for a desired back-EMF.

In yet other embodiments, the desired index angle of the rotor is determined based on the sensed back EMF of the machine. This could be done by measuring the back EMF of the machine such as by using an A/D converter. When the back EMF of the machine is higher than the back EMF at the base speed, the desired index angle would be incremented until the back EMF was correct. In an embodiment that senses the back EMF, one or both of the rotor position sensors described herein could be eliminated.

Whether the angular misalignment between the rotors is determined by a processor while the machine is running, or is determined using look-up tables, or is determined by measuring the back EMF of the machine, the determination value is inputted in a form needed by the actuator to cause the rotors to change in alignment based on the determined value. The actuator receives a signal, and in response to that signal, changes the relative angular position of the rotors.

Figure 7:
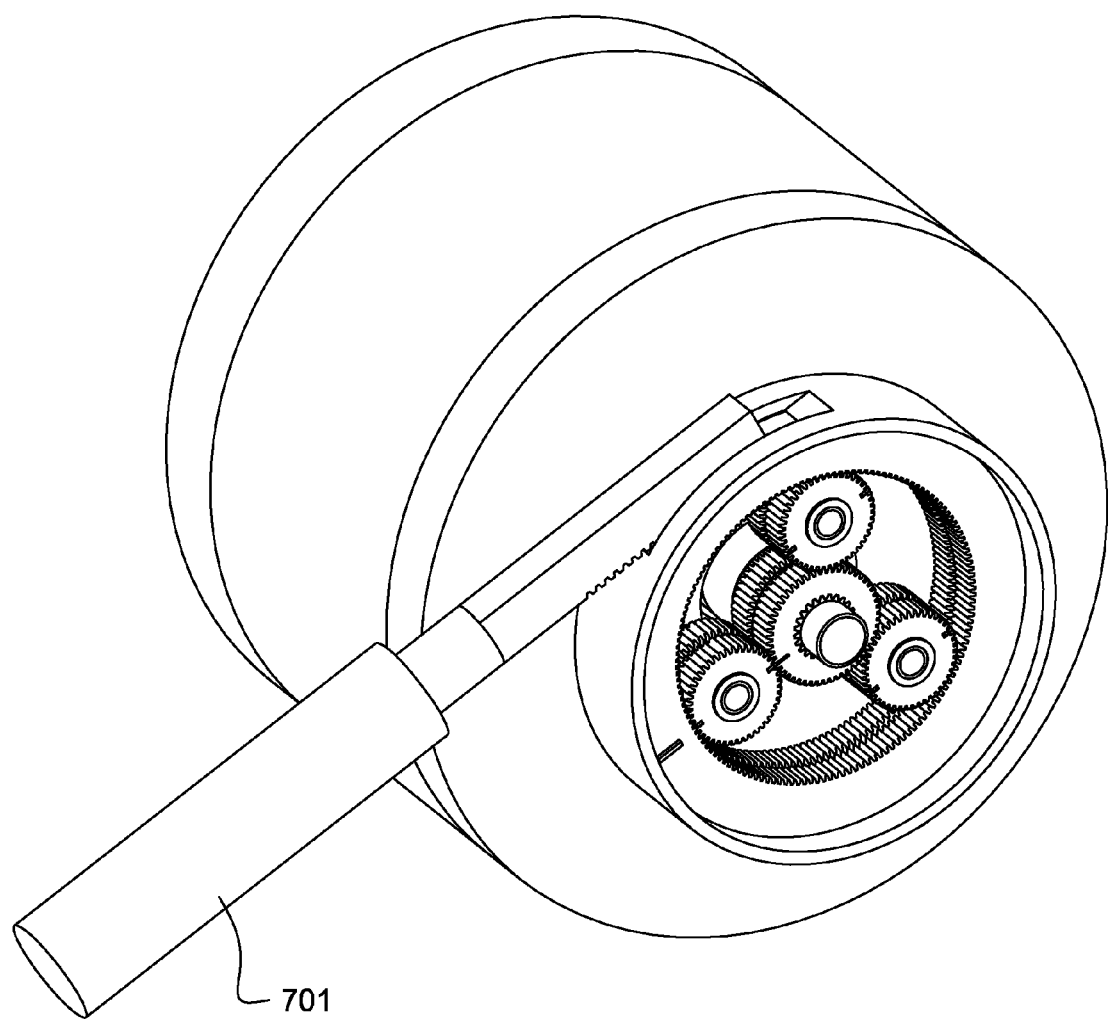
FIG. 7 is a perspective view of an electromagnetic machine of an embodiment of the present invention utilizing a solenoid for changing the relative angular position of the rotors.

In an embodiment for controlling the relative angular position of the rotors relative to each other, one ring gear is stationary, and the second ring gear is rotatable. The rotors are aligned by moving the rotatable ring gear. This ring gear may be rotated by a cylinder which puts a torque on the ring gear. The cylinder could be hydraulic, pneumatic, or electrical. FIG. 7 illustrates the configuration with a ring gear which could be adjusted by a cylinder 701.

Alternatively, the ring gear may be rotated by a worm gear, which engages the ring gear, and rotates it. The configuration with the ring gear is shown in FIG. 1 and FIG. 2. The Actuator 22 drives the worm gear 24.

A method for controlling an electric synchronous machine determines a desired alignment angle between two rotors each having different axial lengths and each having at least one pair of magnets mounted on a periphery thereof, and automatically changes, during operation of the machine, an angular alignment between the two rotors in the machine to the desired alignment angle. The determination of the desired alignment angle is based on at least one of a speed of the machine and a back-EMF. At least one of a processor, a look up table, and a sensed back-EMF of the machine is utilized to make the determination. The method may further entail determining if a speed of the machine is greater than a base speed, and determining the desired alignment angle if the speed of the machine is greater than the base speed. A back-EMF of the machine is controlled by automatically changing the angular alignment between the two rotors in the machine in response to a current speed of the machine. As the speed of the machine increases from the base speed, a resulting back-EMF is kept constant with a base back-EMF that resulted from the machine running at the base speed.

A system for controlling an electric synchronous machine comprises a sensor for sensing a current state of the machine wherein the current state comprises at least one of a speed of the machine, a back-EMF of the machine, and an alignment angle between two rotors each having different axial lengths and each having at least one pair of magnets mounted on a periphery thereof; and an actuator for automatically changing, during operation of the machine and in response to receiving input based on the current state, an angular alignment between the two rotors in the machine. A back-EMF of the machine is controlled by the actuator automatically changing the angular alignment between the two rotors in the machine in response to a current speed of the machine.

A system for controlling an electric synchronous machine comprises control logic for determining, based on a speed of the machine, a desired alignment angle between two rotors each having different axial lengths; and an actuator for automatically changing, in response to changes in speed during operation of the machine, an angular alignment between the two rotors in the machine by the determined desired alignment angle. The control logic determines the desired alignment angle if the speed of the machine is greater than a base speed, and the actuator automatically changes the angular alignment in response to changes in speed above the base speed. A back-EMF of the machine is controlled by the actuator automatically changing the angular alignment between the two rotors in the machine in response to a current speed of the machine.

Figure 8:
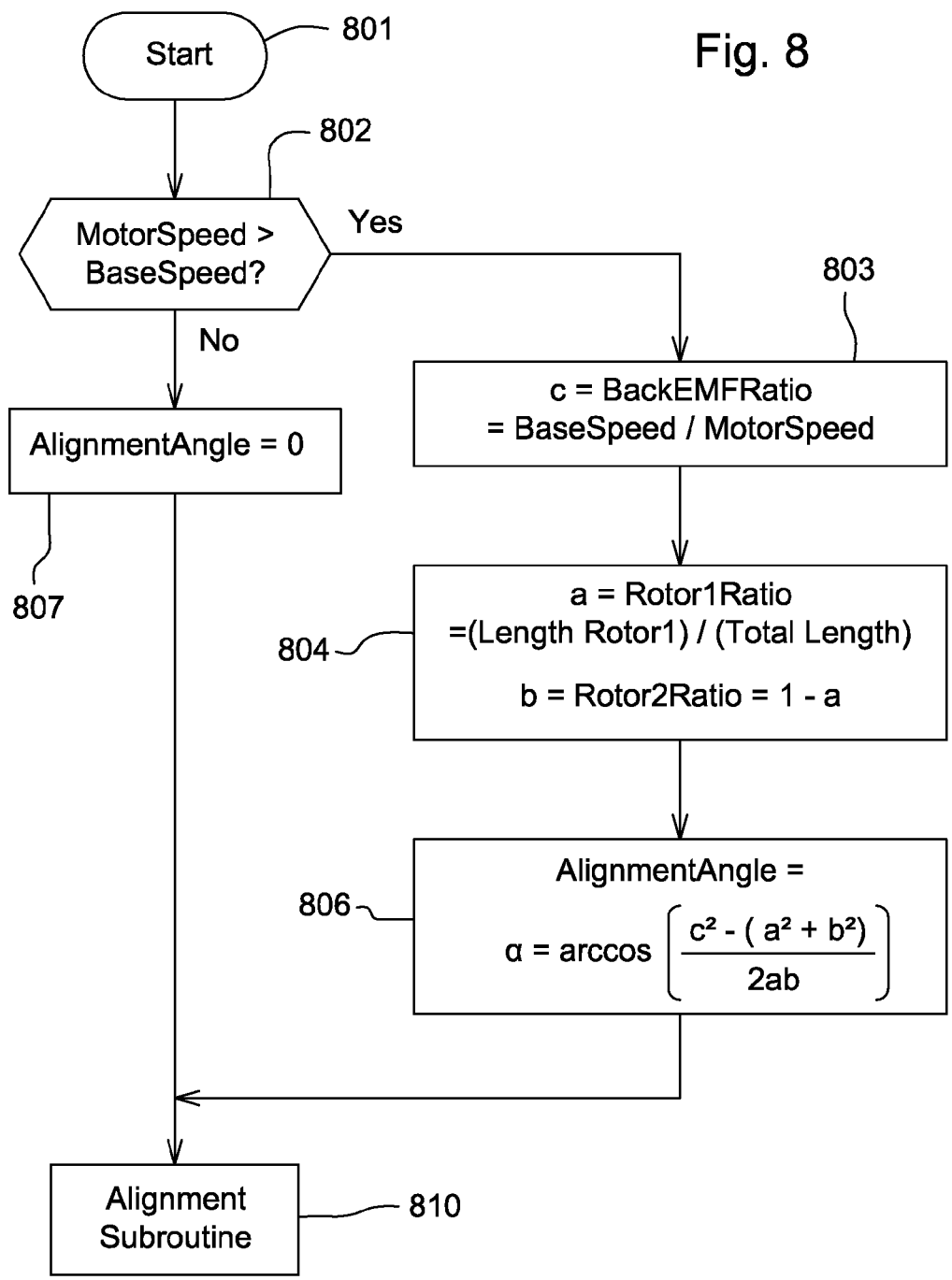
FIG. 8 is a flow diagram of control logic for determining the index angle.
Figure 9:
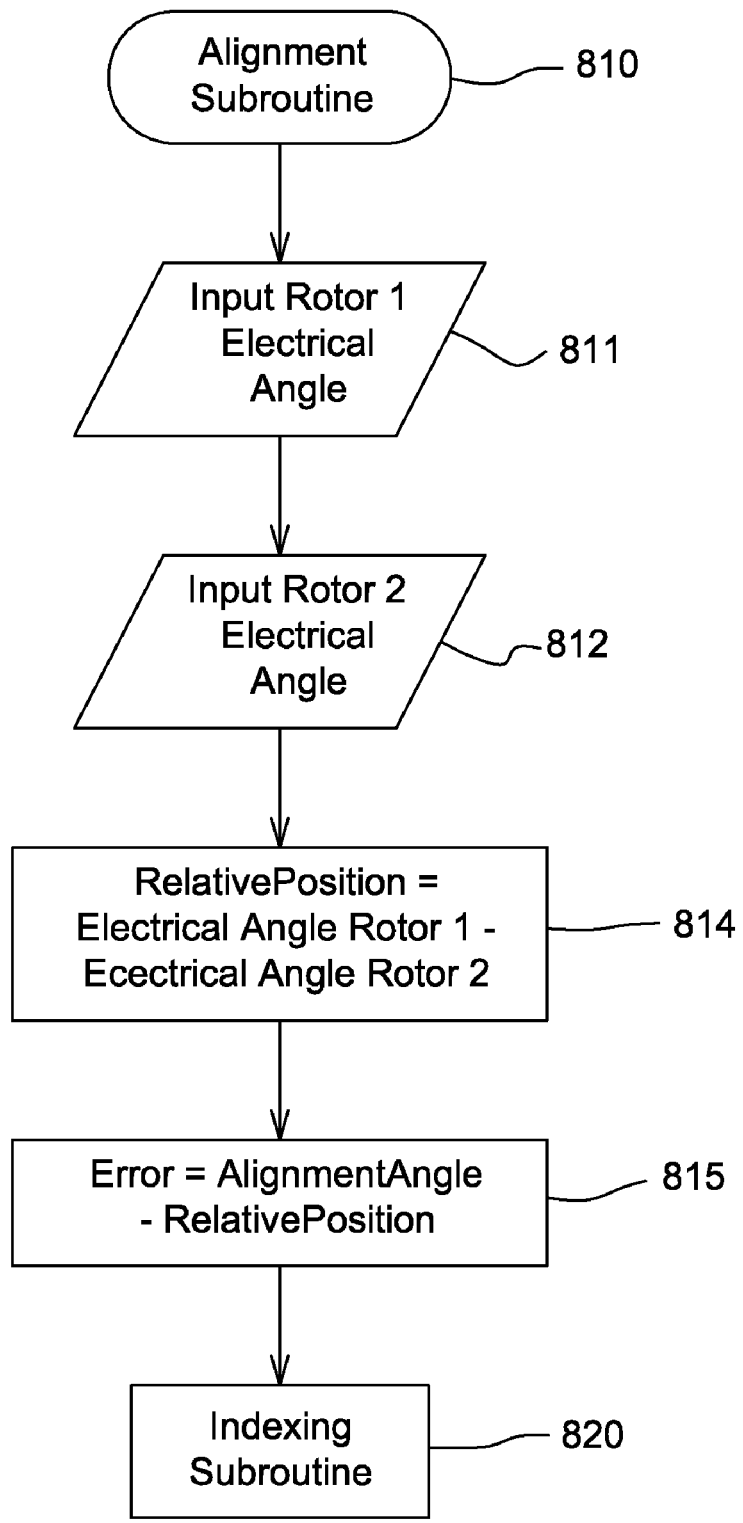
FIG. 9 is a flow diagram of the alignment subroutine.

FIG. 8 is a flowchart of how the index angle would be determined. The process starts 801 and determines if the speed of the motor is greater than a base speed 802. If it is, then "c" is calculated as the back-EMF ratio which equals base speed divided by motor speed, 803. At step 804, the constants "a" and "b" for a given motor are utilized. These constants would be made available from a manufacturer of the motor. Constant "a" is the rotor 1 ratio which is the length of rotor 1 divided by the total rotor length. Constant "b" is the rotor 2 ratio which is equal to 1–"a". At step 806, the alignment angle is calculated as previously described. Processing would then continue to the alignment subroutine 810 as shown in FIG. 9. However, referring back to step 802, if the motor speed is not greater than the base speed, then the alignment angle equals zero, step 807. Processing continues to the alignment subroutine 810 as shown in FIG. 9.

FIG. 9 is a flowchart of the alignment subroutine 810 and how the error of the system would be determined. At steps 811 and 812 respectively, the electrical angle of rotor 1 and rotor 2 is inputted. The relative position is determined by subtracting the electrical angle of rotor 2 from the electrical angle of rotor 1, step 814. The error is determined from subtracting the relative position from the alignment angle, step 815. Processing continues with the indexing subroutine, step 820.

Figure 10:
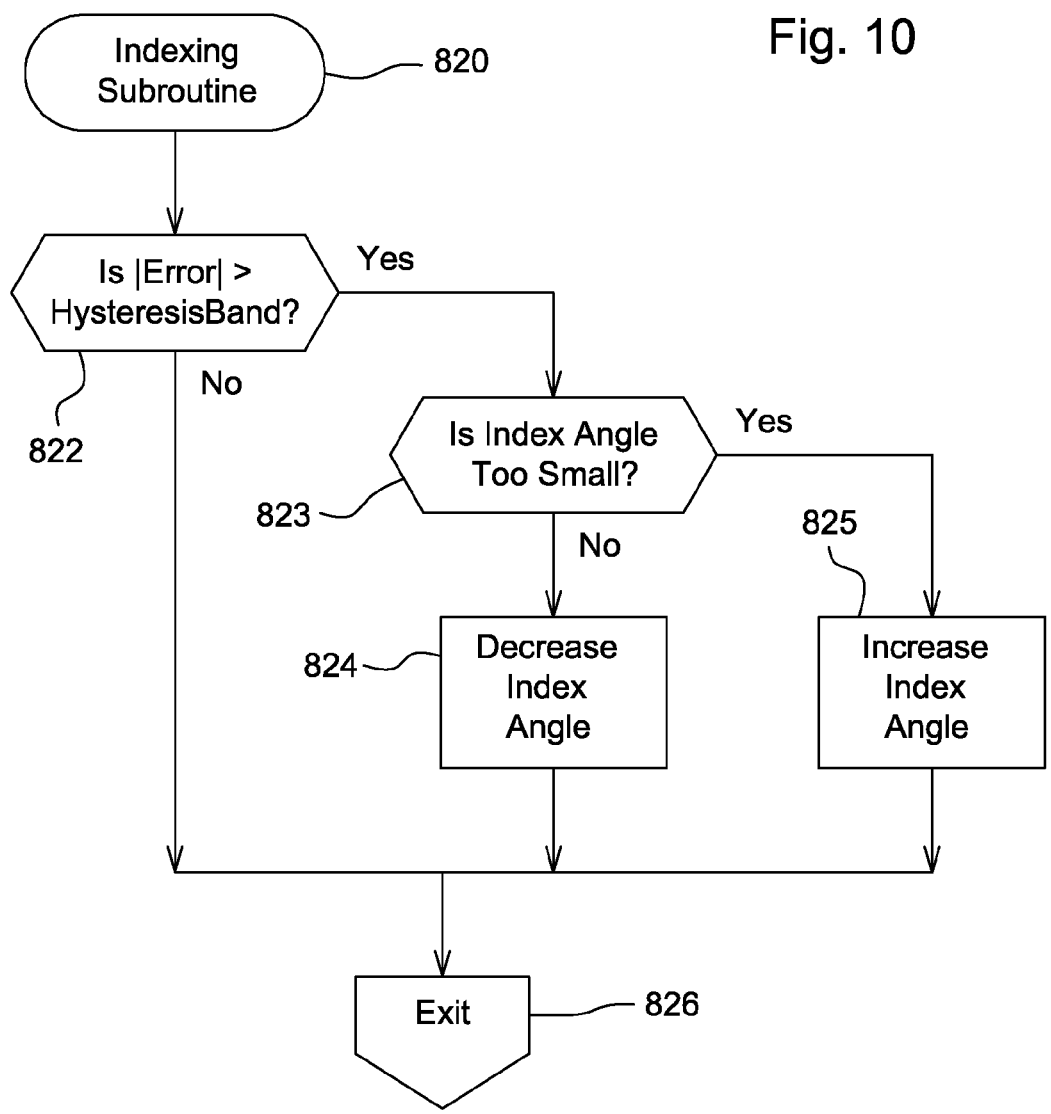
FIG. 10 is a flow diagram of the indexing subroutine.

FIG. 10 is a flowchart of the indexing subroutine 820 and how the indexing could occur, once the error is known. Decision block 822 determines if the absolute value of the error is greater than the hysteresis band. If it is not, then the routine exits at step 826. If it is, then a determination 823 is made if the index angle is too small. If it is, then the index angle is increased at step 825. If it is not, then the index angle is decreased at step 824. The routine then exits at step 826.

Figure 11A:
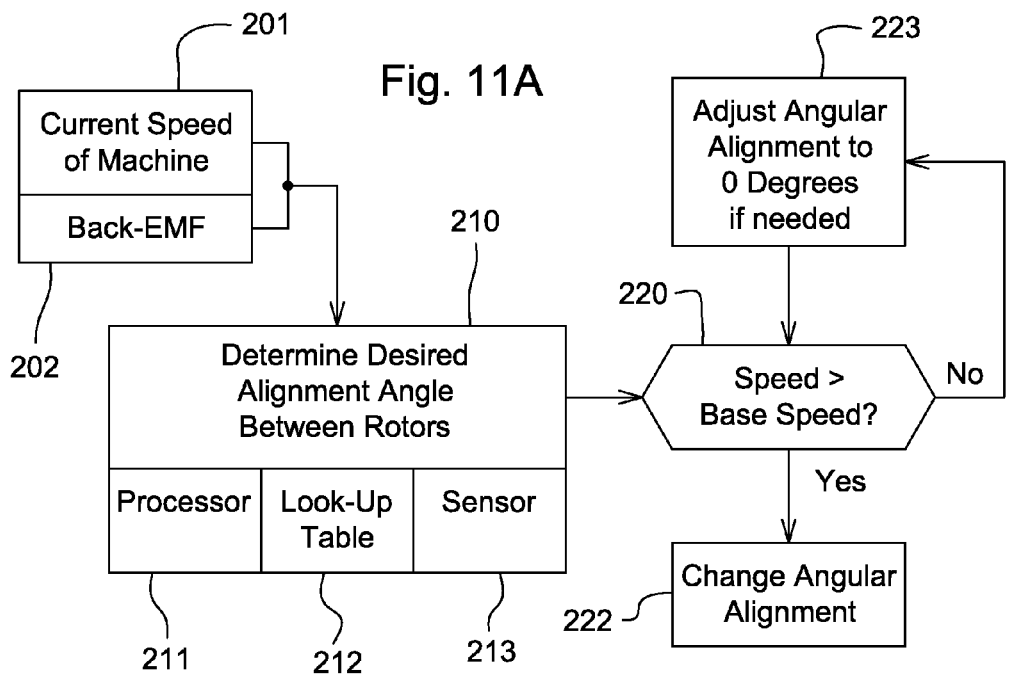
FIG. 11A is a flow diagram of the control logic of an embodiment of the present invention.

FIG. 11A is a flow diagram of an embodiment. A method for controlling an electric synchronous machine determines a desired alignment angle between two rotors each having a different axial length and each having at least one pair of magnets mounted on a periphery thereof 210, and automatically changes, during operation of the machine, an angular alignment between the two rotors in the machine to the desired alignment angle 212. The determination 210 of the desired alignment angle is based on at least one of a speed of the machine 201 and a back-EMF 202. At least one of a processor 211, a look up table 212, and a sensed back-EMF of the machine 213 is utilized to make the determination. The method may further entail determining if a speed of the machine is greater than a base speed 220. If not, the angular alignment is adjusted to, or kept at, 0 degrees 223. If the speed is greater than a base speed, the angular alignment is changed 222. A back-EMF of the machine is controlled by automatically changing the angular alignment between the two rotors in the machine in response to a current speed of the machine. As the speed of the machine increases from the base speed, a resulting back-EMF is kept constant with a base back-EMF that resulted from the machine running at the base speed.

Figure 11B:
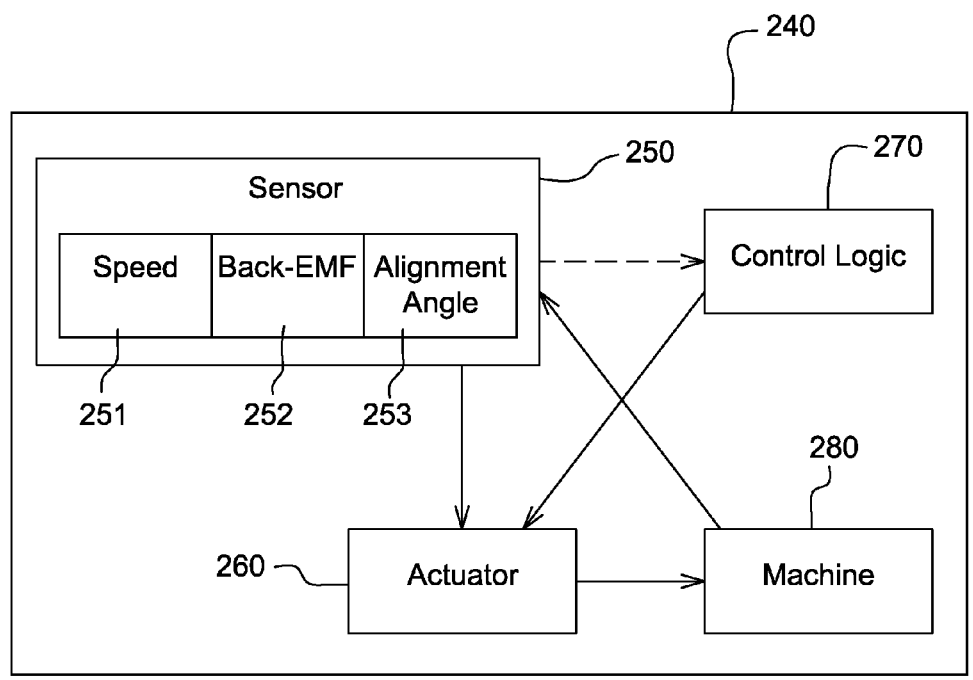
FIG. 11B is a block diagram of a system of an embodiment of the invention.

FIG. 11B is a block diagram of a preferred embodiment. A system 240 for controlling an electric synchronous machine comprises a sensor 250 for sensing a current state of the machine wherein the current state comprises at least one of a speed of the machine 251, a back-EMF of the machine 252, and an alignment angle 253 between two rotors each having different axial lengths and each having at least one pair of magnets mounted on a periphery thereof; and an actuator 260 for automatically changing, during operation of the machine and in response to receiving input based on the current state, an angular alignment between the two rotors in the machine. A back-EMF of the machine is controlled by the actuator automatically changing the angular alignment between the two rotors in the machine in response to a current speed of the machine.

A system 240 for controlling an electric synchronous machine 280 may further comprise control logic 270 for determining, based on a speed of the machine, a desired alignment angle between two rotors each having different axial lengths; and an actuator 260 for automatically changing, in response to changes in speed during operation of the machine, an angular alignment between the two rotors in the machine by the determined desired alignment angle. The control logic 270 determines the desired alignment angle if the speed of the machine is greater than a base speed, and the actuator 260 automatically changes the angular alignment in response to changes in speed above the base speed. A back-EMF of the machine is controlled by the actuator automatically changing the angular alignment between the two rotors in the machine in response to a current speed of the machine.

Figure 12:
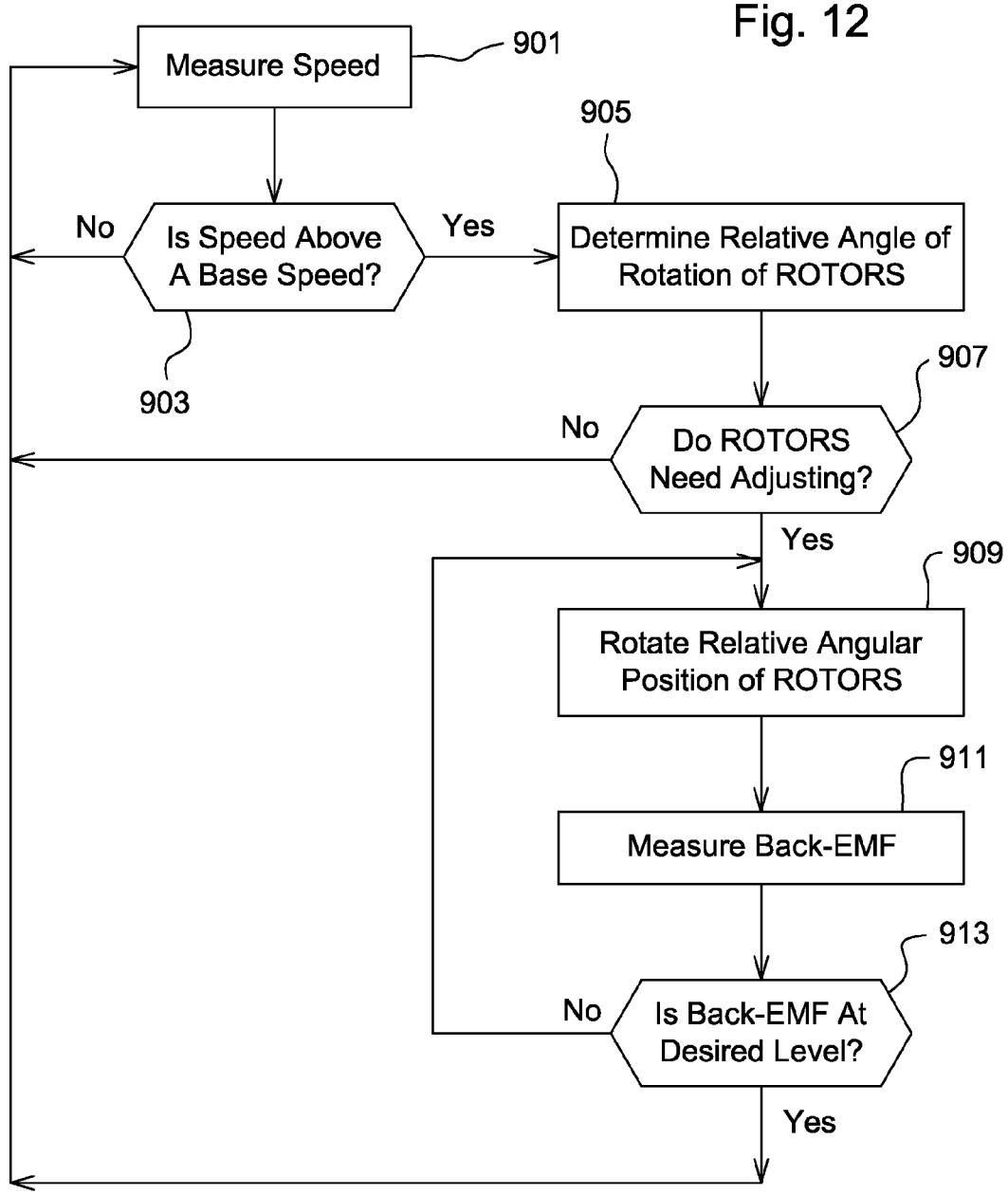
FIG. 12 is a flow diagram of the control logic of an embodiment of the invention.

FIG. 12 is a flow diagram of control logic for an embodiment of the invention. The speed of the machine is sensed by a sensor 901 and inputted to the control logic which determines if the speed is above a base speed 903. If not, the speed continues to be sensed 901 until a determination 903 is made that it is above a base speed. If it is above a base speed, the control logic determines a relative rotation of the rotors to achieve a desired angular alignment 905. This determination can be made utilizing microcode, program coded instructions and a processor in accordance with the calculations provided herein, or utilizing a look-up table previously created for a given machine. Based on inputs, the control logic determines if the rotors need adjusting to achieve this desired angular alignment 907. If no, the control flows back to step 901. If yes, a signal is sent to an actuator to rotate the angular position of a rotor relative to the other rotor based on the determined desired angular alignment 909. The back-EMF is measured 911. The control logic determines if the measured back-EMF is at a desired level 913. If not, the relative angular alignment of the rotors are adjusted 909 and control passes back to measuring the back-EMF 911. If the back-EMF is determined to be at a desired level 913, then control passes to step 903 to determine if the speed is above a base speed 903.

Figure 13:
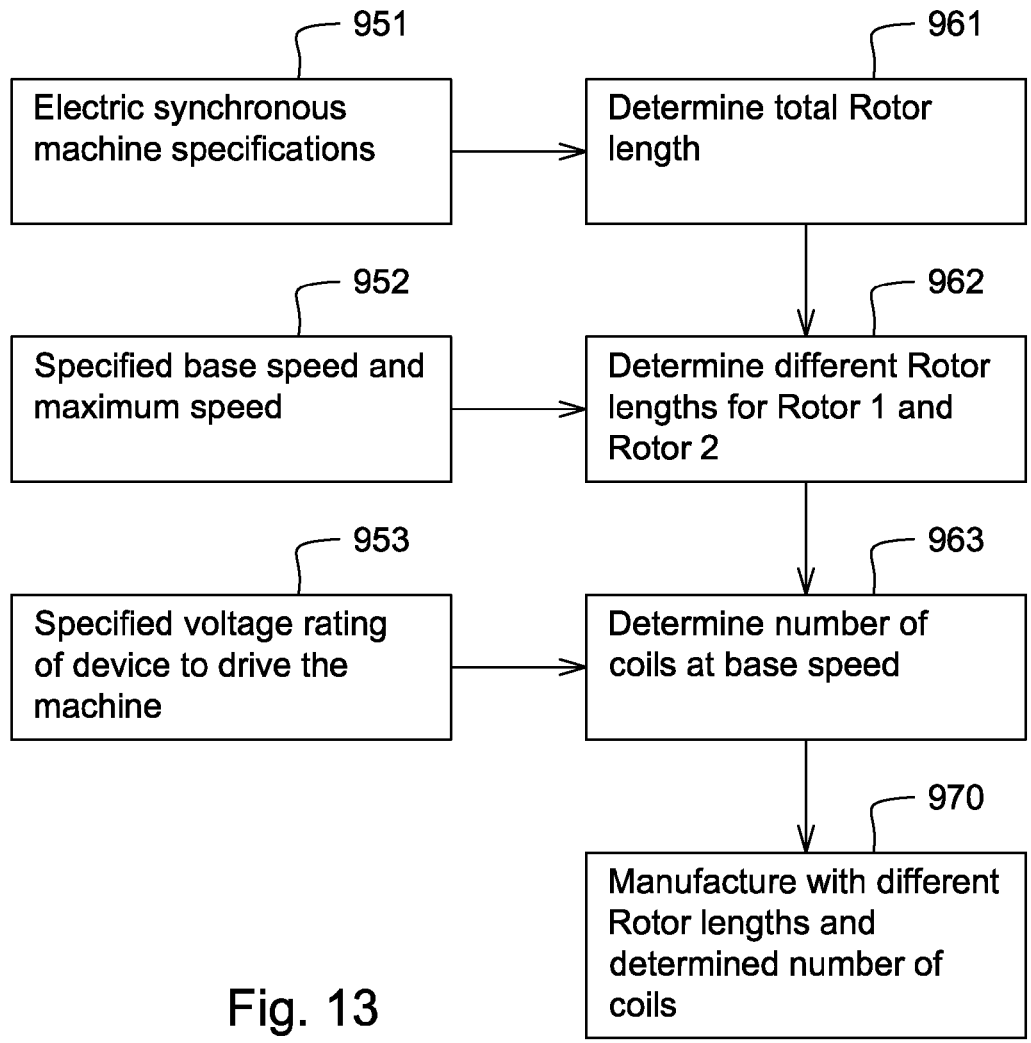
FIG. 13 is a process flow diagram for manufacturing an electric synchronous machine.

FIG. 13 is a process flow diagram for manufacturing an electric synchronous machine. Input is received 951 as to the specifications for a given electric synchronous machine including size. A total rotor length that would be needed for one rotor is determined 961 for the given specified machine. Input is received 952 specifying a base speed and maximum speed for the given electric synchronous machine. From this input 952 and from the determined total rotor length 961 a determination of the different rotor lengths is made 962. Input is received 953 which specifies a voltage rating of at least one device to drive the machine. From this, the number of coils required at a base speed is determined. An electric synchronous machine is manufactured having different rotor lengths and the determined number of coils 970.

An advantage of the above embodiments encompassing rotors of different axial lengths is that the electric synchronous machine can then provide a back EMF when the rotors are fully misaligned, i.e., aligned at 180 degrees to each other with one pair of magnets each.

An advantage of the above embodiments is that the motor, i.e., the electric synchronous machine, can be designed to require significantly less current at low speeds. Given a rotor and stator design, the number of coils in a motor is limited by the maximum back EMF the machine is rated for. In conventional permanent magnet machines, this maximum occurs at the highest rated speed. In embodiments herein, this maximum occurs at a lower base speed. The embodiments described allows the back EMF of the machine to be reduced at speeds above the base speed enabling the back EMF to be held constant with that at the base speed. Therefore, the number of coils can be increased. For instance, if the back EMF of the machine is cut in half, the number of coils can be doubled.

The current requirement of the machine is determined by the number of coils and the amp turn requirement of the machine. The current requirement is the amp turn requirement divided by the number of coils. Therefore, if the number of coils is doubled, the current requirement is cut in half. Similarly, if the back EMF can be reduced to one third, the coils can be tripled, and the current requirement will be reduced to one third of the original current requirement. As such, the current requirement can be reduced the same percentage amount as the back EMF is reduced. Similarly, the current requirement can be reduced by the same percentage amount that the number of coils is increased. This reduces the current requirements of the power electronics.

Another advantage of the above is that if the number of coils is not increased, the voltage requirement of the power electronics is reduced. The maximum back EMF will be lower, and therefore devices which are rated for lower voltage may be used. Both of the above will reduce the cost of the power electronics.

It should be noted that the term "angular alignment" refers to an angle in which an orientation of the magnets on one rotor makes with the orientation of the magnets on the other rotor. The rotors are referred to as being in angular alignment, if the rotors are aligned in such a way to achieve a certain relative angle between them. If the angle is anything other than 0 degrees, the rotors could also be said to be misaligned. The terms misalignment and alignment may be used interchangeably herein to describe a relative angular offset or displacement at some degree. Angular alignment includes alignment at 0 degrees and a misalignment of any degree.

While the present invention has been described in conjunction with a specific embodiment, it is understood that many alternatives, modifications and variations will be apparent to those skilled in the art in light of the foregoing description. For example, the rotors and magnets can have different sizes, shapes and materials, or the rotors can carry fewer or more magnets. Accordingly, this invention is intended to embrace all such alternatives, modifications and variations which fall within the spirit and scope of the appended claims.

Having described the preferred embodiment, it will become apparent that various modifications can be made without departing from the scope of the invention as defined in the accompanying claims.

The invention claimed is:

1. A method for manufacturing an electric synchronous machine, comprising:
   predetermining a total rotor length for a first rotor length and a second rotor length for a given specified machine;
   determining a first set of different separate rotor lengths for each rotor dependent upon a desired base speed and maximum speed of the given specified machine, wherein the maximum speed is different from the desired base speed; and
   manufacturing the electric synchronous machine with the determined first set of different separate rotor lengths.

2. The method of claim 1 wherein $\Delta$=base speed/maximum speed, and

Length of first rotor=$(0.5+\Delta/2)$*total rotor length

Length of second rotor=$(0.5-\Delta/2)$*total rotor length.

3. The method of claim 1 further comprising:
   determining, for a specified voltage rating of at least one electronic motor device to drive the machine, a first number of coils based on a back emf at the base speed; and
   manufacturing the electric synchronous machine with the first number of coils determined.

4. The method of claim 3 wherein the first number of coils is increased from a second number of coils required if the second number is based on the back emf at the maximum speed, whereby the increased number of coils decreases the current requirement of the machine.

5. The method of claim 1 wherein the electric synchronous machine is manufactured with a determined second set of different separate rotor lengths, having a same combined total rotor length as the first set of different separate rotor lengths, for a second desired base speed and a second maximum speed, and wherein the second maximum speed is different from the second desired base speed.

* * * * *